WILLIAM L. BRADLEY.
Improvement in Treating Refuse Animal Matter
for the Manufacture of Fertilizers.
No. 124,112. Patented Feb. 27, 1872.
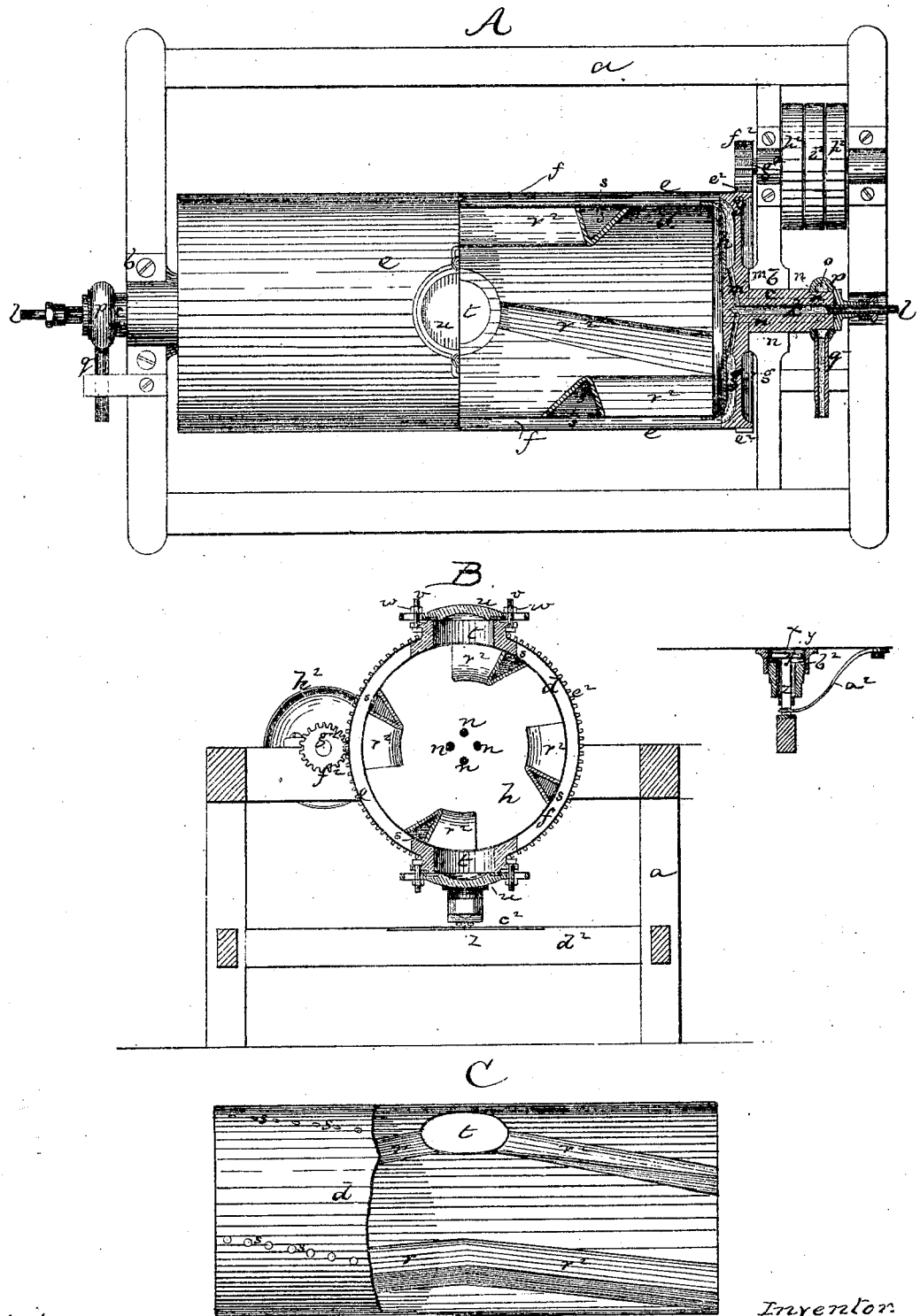

124,112

UNITED STATES PATENT OFFICE.

WILLIAM L. BRADLEY, OF BOSTON, MASSACHUSETTS.

IMPROVEMENT IN TREATING REFUSE ANIMAL MATTER FOR THE MANUFACTURE OF FERTILIZERS, &c.

Specification forming part of Letters Patent No. 124,112, dated February 27, 1872.

*To all whom it may concern:*

Be it known that I, WILLIAM L. BRADLEY, of Boston, in the county of Suffolk and State of Massachusetts, have invented an Improvement in Treating Refuse Animal Matters, &c.; and I do hereby declare that the following, taken in connection with the drawing which accompanies and forms part of this specification, is a description of my invention sufficient to enable those skilled in the art to practice it.

My invention relates particularly to a method of treating waste animal matter to reduce the same, or to prepare it for reduction, by driving off the liquid matter therefrom, the apparatus employed and embodying my invention being, however, applicable to the drying of other substances.

In my invention I employ a long main cylinder or chamber, for receiving the material to be treated, surrounded by a concentric cylinder, there being a space or chamber between them, which space is a steam-chamber, into which steam is admitted from a boiler, the two cylinders rotating as one, and there being at the center of the cylinders one or more openings leading into the main chamber. Within the main cylinder or cylinder-chamber there may be placed longitudinal and spirally-arranged lifter-blades, which not only take up the material as they revolve, and thereby keep it in motion, but also keep the material moving toward the ends of the cylinder, or toward the center thereof, dependent upon and in accordance with the direction of rotation of the cylinder. When the chamber is first charged, the cylinder is so rotated as to gradually carry the material toward the opposite ends of the chamber, and the cylinder is then rotated in the opposite direction to carry the material in the opposite direction, these alternate rotative movements being continued until the material is sufficiently dried. When the material is ready to be discharged, the cylinder is rotated in a direction to carry the material toward the center, so that if the charging hole or holes be uncovered the dried material will be thrown out therefrom. The main chamber is a tight chamber, except that provision is made for admission of heated air under pressure at one end of the cylinder, and for escape of said air loaded with the moisture driven or evaporated from the animal or other fatty or moist matters. There is also provision for the automatic opening of a valve to let off the water of condensation from the steam-chamber. My invention consists, primarily, in the peculiar construction, arrangement, and method of operation of the two cylinders or chambers and their steam and water passages and other devices.

The drawing represents an apparatus embodying the invention.

A shows the machine partly in plan, and partly in horizontal axial section. B is a cross-section on the line $x\ x$. C shows the main or drier-cylinder partly in plan and partly in section. $a$ denotes a frame, having at opposite ends suitable bearings, $b$, upon which are mounted and turn the tubular trunnions or gudgeons $c$ of the rotary drying-cylinder. This cylinder is a compound or double cylinder, the inner cylinder or chamber $d$ being that for containing the material to be treated, and the outer one, $e$, being a jacketing-cylinder or a cylinder inclosing an annular space, $f$, said space being charged with steam to heat the inner cylinder and its contents. At each end of the outer cylinder is a tight head, $g$, and at each end of the drier-cylinder a head, $h$, the space between the two heads opening into the annular space $f$ between the two cylinders. Extending through each trunnion or journal is an axial passage, $k$, the outer end of either of which may connect with a pipe, $l$, leading from the boiler, provision by suitable packing being made for rotation of the cylinders without rotation of the pipe. From the inner end of the tube or passage $k$ radial passages $m$ extend to and into the steam-space $f$. Parallel with the axial passage $k$ and extending through each journal or gudgeon, and opening into the drier-chamber are passages $n$, the outer ends of which open from an annular space or groove, $o$, in a ring, $p$, a pipe, $q$, from a suitable blowing apparatus connecting with this ring $p$ and its annular passage, so that dry hot air forced through the passages $n$ into and through the cylinder will, in its passage through and from the cylinder, take up and carry off all vapor or moisture evaporated or driven from the charge in the chamber, the air entering at one end and escaping through the pipe at the opposite end, which latter pipe may be led into suitable liquid or chemicals for absorbing the noxious gases. In the cylinder or chamber are longitudinal lifters or blades $r$ $r^2$, extending from the inner surface of the cylinder, each of these blades being preferably made hollow, with openings $s$ communicating with the steam-space $i$. The steam heats and keeps hot the surfaces of the blades, and as the cylinder rotates the material is taken up by some of the blades, and is carried up until by gravity and the position of the blades it falls onto other blades, to be again similarly taken up and let fall by them, and the heated surfaces of the shelves and of the cylinder, and the current of hot air through the cylinder, and the movement and attrition of the matters, not only decompose such matters but very rapidly exhaust all moisture therefrom. The blades are made inclining in the direction of their length, or are set spirally, so that as the cylinder rotates in one direction the shelves all slant down toward the ends of the cylinder as they carry the material up, while, as the cylinder rotates in the opposite direction, they slant toward the center as they take the material up. At the center of the cylinder are one or more charging and discharging-openings, $t$, extending through both cylinders into the drier-chamber, each opening $t$ being closed by a cap or man-hole plate, $u$, which is held in place by screw-bolts $v$ and nuts $w$, a suitable packing-ring being used to form a tight joint. Said opening or openings being placed in the plane of the angle of each two blades or lifters, $r$ $r^2$, the material is all thrown to the center of the cylinder, or into such position that it will be discharged when the plates $u$ are removed and the cylinder is rotated in the direction to carry the material centerward, the new charge of material being in like manner carried toward the ends of the cylinder when the plates $u$ are secured upon the openings, and the cylinder is rotated in the opposite direction. Steam being let into the chamber condenses, and, to let off the water of condensation, the steam-chamber has an outlet, $x$, controlled by a valve, $y$, which valve is at the end of a stem, $z$, a spring, $a^2$, keeping the valve normally closed or upon its seat, $b^2$. As the cylinder rotates, and the valve-stem passes down its outer end strikes a plate, $c^2$, on the upper surface of the cross-beam $d^2$, lifting the stem and opening the valve, so that the condensed water flows from the cylinder, the outlet being at its lowest position. When the valve-stem has passed out of contact with the beam, the stress of the spring again closes the valve. The steam entering one end of the steam-chamber under pressure, the excess of steam may be let off, or circulation of the steam kept up by means of a discharge-tube at the opposite end of the cylinder.

The operation of the machine is as follows: The cover-plate being removed from one of the man-holes or openings, the drier-cylinder is charged with the animal matter or other material to be treated, and the plate is then fastened over the opening. Rotation is then imparted to the cylinders, and steam is let into the steam-chamber $f$ surrounding the drier-cylinder, the drier-cylinder and its contents being thereby heated. Then air, under pressure, is let into the drier-cylinder through one of the tubes $q$ and the journal-encompassing grooved or chambered ring $p$, upon which the journal rotates. By the heat from the steam, and the constant agitation of the material, the juices and liquid matters are rapidly extracted from the material, and, by the current of hot air passing under pressure through the cylinder, all liquid matter exuding from the material is rapidly borne off through the opposite air-tube. The material being thus quickly deprived of all its moisture, the process being hastened by the alternate movements given to the material by the reverse inclination of the lifter-blades and the rotation of the cylinder in opposite directions. The heating of the blades, of course, also facilitates the drying operation, as whatever surfaces the material comes into contact with are hot. Instead of the long blades, spirally arranged, pins may be used, said pins being preferably made hollow, and to connect with the steam-chamber. To rotate the cylinder, one of the heads may be provided with a gear or gear-teeth, $e^2$, driven by a pinion, $f^2$, on a shaft, $g^2$, on which are two loose pulleys, $h^2$, and a center fast pulley, $i^2$, a straight and a crossed belt being used, one running on the fast pulley, and the other on one of the loose pulleys, and the opposite movements of the cylinder being effected by shipping first one belt on the fast pulley and then the other.

I am aware that in the patent to H. A. Hogel, dated May 2, 1871, there is shown for desiccating animal matter a fixed steam-jacketed receptacle for holding such material, in which receptacle a tubular stirrer, capable of conveying air in steam currents, is operated to manipulate the charge to be stirred and dried. To such construction I make no claim herein, viewing my specific construction herein shown as an improvement upon that shown by Hogel.

I claim—

1. The rotary drier-cylinder, having an annular steam-chamber surrounding, fixed to, and rotating with the drier-chamber, into which steam-chamber steam is admitted, substantially as described, the drier-chamber having provision for admission and escape of air under pressure through its opposite trunnions, and the steam-chamber for admission of steam also through either of the trunnions, substantially as shown and described.

2. Also, a rotary steam-jacketed drier-cylinder, having the charging and discharging-openings located as shown, and provided with tight covers or caps, substantially as shown and described.

3. In a rotary drier-cylinder, having such charging and discharging-opening or openings, the lifter-blades, arranged to throw the material toward the opposite ends of the chamber when the cylinder is rotated in one direction, and toward the central part of the cylinder, where the openings are located, when the cylinder is rotated in the opposite direction.

4. In a rotary steam-jacketed drier-cylinder, the let-off valve for discharging the water of condensation, substantially as described.

5. The connection of the air-inlet and outlet pipes with the chambered journals, so as to admit and discharge air through the journals while the cylinder is rotating, substantially as described.

6. In combination with a rotary and steam-jacketed drier-cylinder, hollow lifter-blades or pins, communicating with the steam-chamber, substantially as described.

7. Also, the improvement in drying or treating animal matter by inclosing it in a steam-heated rotary cylinder, and forcing air through said cylinder, substantially as described.

WM. L. BRADLEY.

Witnesses:
FRANCIS GOULD,
M. W. FROTHINGHAM.